United States Patent
Rottner et al.

[11] Patent Number: 5,859,691
[45] Date of Patent: Jan. 12, 1999

[54] PHOTOFINISHING DEVICE WITH INTERCHANGEABLE FILM DECKS

[75] Inventors: Bruce E. Rottner, Rochester; Curtis Edward DeWolff, Fairport, both of N.Y.

[73] Assignee: Eastman Kodak Company, Rochester, N.Y.

[21] Appl. No.: 620,054

[22] Filed: Mar. 20, 1996

[51] Int. Cl.$^6$ ............................ G03B 27/62; G03B 27/64
[52] U.S. Cl. ................................................ 355/75; 355/76
[58] Field of Search ................ 355/72–76; 352/221–232

[56] References Cited

U.S. PATENT DOCUMENTS 4,264,825 4/1981 Bowen .
4,360,195 11/1982 Schon et al. .
5,673,104 9/1997 Rottner ...................................... 355/75

FOREIGN PATENT DOCUMENTS 2114099 8/1983 United Kingdom .

Primary Examiner—Richard Moses
Assistant Examiner—Shival Virmani
Attorney, Agent, or Firm—Frank Pincelli

[57] ABSTRACT

A photofinishing device for handling different formats of photographic film. The photofinishing device comprising a work station for photofinishing a respective format type of photographic film, means for moving the respective format type of photographic film along the work station, and at least one sensor assembly pivotably mounted to the photofinishing device so as to move between an engaged position and a non-engaged position, the at least one sensor assembly having a sensor, the at least one sensor being in substantial contact with the film when the sensor assembly is in the engaged position, the at least one sensor assembly when in the non-engaged position allowing easy access to the sensor.

9 Claims, 9 Drawing Sheets

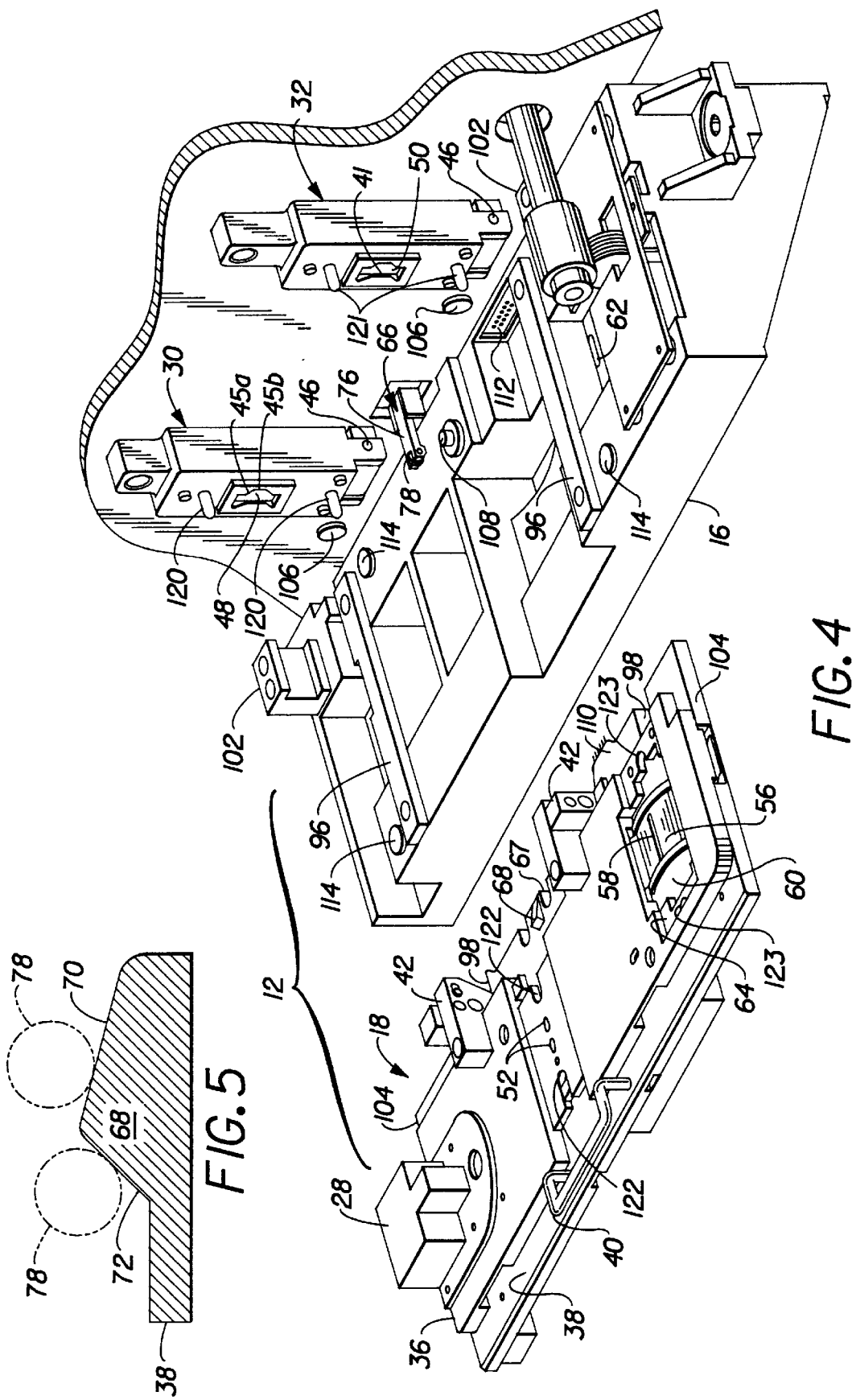

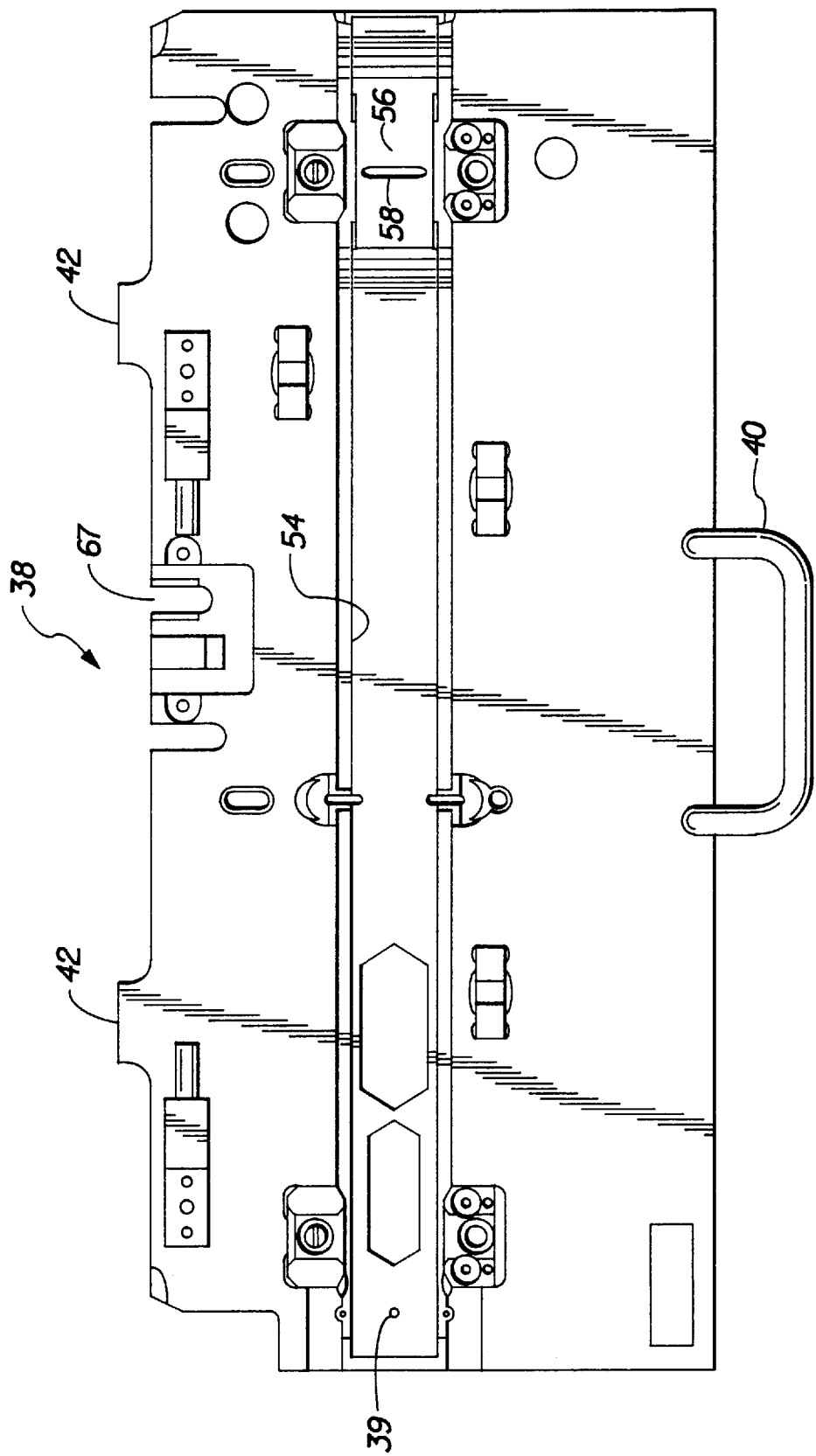

PHOTOFINISHING DEVICE WITH INTERCHANGEABLE FILM DECKS

FIELD OF THE INVENTION

This invention relates in general to photofinishing equipment. More specifically, but without restriction to the particular embodiment hereinafter described in accordance with the best mode of practice, this invention relates to a photofinishing device having interchangeable film decks each capable of accurately positioning a respective film track.

BACKGROUND OF THE INVENTION

The art of image processing has developed dramatically over the last several years. In the recent past, image processing was clearly divided into two general areas. The first and oldest of these two areas includes picture photography. This generally involves a camera having an objective lens and a photosensitive film moved within the camera to expose parts of the film to reflected light-carrying visual information. The photosensitive film is then developed in a chemical process to create fixed images on the film. The film is typically picture film which is usually employed to make photographic prints, or movie film that can be projected onto a screen for motion picture viewing.

Recent advances in the electronic arts have lead to the development of a second area of image processing which includes electronic or video imaging. This type of imaging may involve use of a charge coupled device or CCD scanner array to transform reflected light information to an electronic signal. This electronic signal is processed by processing circuitry to a form that can be displayed on a CRT monitor or employed for other purposes.

Mechanical processing equipment designed for handling exposed photographic film and photosensitive paper has experienced a concomitant development along with the technical advancements achieved in the cameras used in picture photography. For example, the photographic printing apparatus illustrated in U.S. Pat. No. 3,156,172, which issued Nov. 10, 1964 to W. Baasner, includes a housing for storing a supply of photographic printing paper which is positioned adjacent an exposure station. The paper is fed through the exposure station and then cut into separate photographs so as to produce a plurality of photographs in a systematic manner. U.S. Pat. No. 4,161,365, issued Jul. 17, 1979 to R. D. Anderson et al, shows a negative holding device for use in a photographic printer. The Anderson et al negative holding device includes two hinged plates, each having an aperture in register with the other. A negative film is placed between the plates with the desired frame situated within the aperture. The device is then inserted into the print gate of a printer. To move the film through the Anderson et al device, it is necessary to manually operate a lever and reposition the film, again by hand, frame by frame. This device is, therefore, necessarily limited to a relatively slow print speed. The negative film carrier described in U.S. Pat. No. 4,933,716, issued Jun. 12, 1990 of T. Imamura et al, includes driving means for automatically feeding the exposed processed film through the carrier so that each frame of the film can be moved to a printing position. The Imamura et al film carrier, however, is limited to one type of film and is not adapted to be readily released from its associated printer. Another negative film handling apparatus is shown in U.S. Pat. No. 4,994,850 of T. Imamura et al, which issued Feb. 19, 1991. This film handling apparatus is restricted to short photographic film of a specific size that is manipulated for printing purposes only.

The increased sophistication in mechanics combined with software and microprocessors has resulted in the now common fully automated developing and printing apparatus. It has thus become cost effective for small boutiques to service the demand for developing and printing photographs by having to invest in only one or two pieces of equipment. A variety of such developing or printing apparatus have been proposed. These apparatus may have both film and paper processing capabilities, or be designed for either specifically processing film or printing photographs. This type of apparatus is exemplified by the photographic processing apparatus illustrated in U.S. Pat. No. 4,853,742, which issued Aug. 1, 1989 to B. Payrhammer et al. This apparatus is a photographic printer or developing machine that includes a station for processing photographic material. The Payrhammer et al apparatus includes a number of mobile carriage supply and take-up cassettes that allow the apparatus to function in a continuous automated manner.

In commonly assigned copending U.S. patent application Ser. No. 08/171,582, filed Dec. 22, 1994 in the name of Francis C. Long, Walter C. Slater, Thomas J. Murray, Bradley C. DeCook and Howard C. Bozenhard, entitled "Film Processing System", a system for high speed photofinishing of exposed processed photographic film is disclosed. The system includes a high speed printer manufactured by Eastman Kodak Company, and employed in conjunction with a film preparation work station. The high speed printer produces photographic prints. The film preparation work station, in addition thereto, combines electronic scanning capabilities with exposed processed photographic film. The work station includes a CCD array positioned over a film track. Rolls of exposed processed film, typically negative film, are spliced end-to-end and wound on a first reel. The free end of the film on the first reel is channeled through a film track and threaded on to a second reel. As the film is moved through the film track, light is passed through the film. The resulting image is then received by the CCD array, converted to an electronic signal, and transmitted to circuitry for electronic processing and storage. This signal is then sent to an apparatus digital printer for producing index prints. In addition, the electronically stored image information may be forwarded to a high speed optical printer for setting printing variables such as light exposure. The above system gives the flexibility of producing high quality photographic prints by use of related electronic images easily manipulated and indexed by application software. In either the high speed printer or film preparation work station, 35 mm exposed processed film serves as the primary source for the images. It is desired that these be capable of using other format films. In order to do so, it is required that certain parts of the equipment be changed so as to accept different format film. This takes substantial amounts of time and labor. This becomes critical in high production labs as orders received that day are often required to be processed and sent back out that same day. Prior art equipment does not easily convert from one format film to another format film. As used herein, format means the size of film which might commonly be 35 mm film, 110 format, or median format, as typically used by professional photographers, or other differently sized film. An additional problem with prior art devices is that CCD array sensors are typically positioned below the film plane and require optics in order to properly focus the projected image onto the CCD array. This type arrangement is relatively expensive and difficult to keep clean. Since the sensor is below the film, debris and dust quickly accumulate on the sensor, affecting its performance.

SUMMARY OF THE INVENTION

It is, therefore, an object of the present invention to improve film photofinishing equipment.

Another object of this invention is to interface fast moving film with photofinishing equipment.

Still a further object of the present invention is to enable a particular piece of photofinishing equipment to accommodate film of different sizes or formats.

Yet another object of the present invention is to allow a change of film format in a specific piece of film photofinishing equipment with minimum changeover time.

An additional object of the present invention is to reduce the number of pieces of film processing equipment required to process a variety of film formats and sizes. Still another object of the present invention is to provide a device which minimizes the dust and debris that may build up on the sensor and allow easy service of the sensor.

These and other objects are attained in accordance with the present invention wherein there is provided a photofinishing device for handling different formats of photographic film. The photofinishing device comprising a work station for photofinishing a respective format type of photographic film. A transport mechanism is provided for moving the respective format type of photographic film along the work station. At least one sensor assembly is pivotably mounted to the photofinishing device so as to move between an engaged position and a non-engaged position. The at least one sensor assembly having a sensor which is in substantial contact with the film when the sensor assembly is in the engaged position. The at least one sensor assembly when in the non-engaged position allowing, easy access to the sensor.

In another aspect of the present invention there is provided a photofinishing device for handling different formats of photographic film. The photofinishing device comprising a work station for photofinishing a respective format type of photographic film. A first deck is provided for containing a first format type of photographic film at the work station so that the first format type of photographic film may be processed while it is maintained in a specified orientation relative to the work station. The deck is releasably secured from the work station and can be replaceable with a second deck for containing a second format type of photographic film at the work station so that when the respective format type of photographic film is changed from the first format type to the second format type, the second format type of photographic film may be photofinished while it is maintained in a specified orientation relative to the work station. At least one sensor assembly is pivotably mounted to the photofinishing device so as to move between an engaged position and a non-engaged position. The at least one sensor assembly having a sensor such that the at least one sensor is in substantial contact with the film when the sensor assembly is in the engaged position. The at least one sensor assembly, when in the non-engaged position, allowing easy access to the sensor.

In yet another aspect of the present invention there is provided a photofinishing device for handling different formats of photographic film. The photofinishing device comprising a work station for photofinishing a respective format type of photographic film, a transport mechanism for moving the respective format type of photographic film along the work station, and at least one sensor assembly mounted to the photofinishing device for movement between an engaged position and a non-engaged position. The at least one sensor assembly having a sensor, the at least one sensor assembly being positioned above the photographic film in the work station when in the engaged position.

BRIEF DESCRIPTION OF THE DRAWINGS

Further objects of the present invention, together with additional features contributing thereto and advantages accruing therefrom, will be apparent from the following description of a preferred embodiment of the invention which is shown in the accompanying drawings, with like reference numerals indicating like components throughout, wherein:

FIG. 4 is an isolated perspective view of the film deck assembly in accordance with the present invention, illustrating the film deck in a closed condition and removed from the work station of a photofinishing device;

FIG. 5 is a simplified schematic representation of the area inscribed by circle 5 of FIG. 4, showing operation of a roller arm as employed to retain the film deck in the work station;

FIG. 6 is a top plan view of the lower plate of the film deck of the present invention;

DETAILED DESCRIPTION OF A PREFERRED EMBODIMENT

Figure 1:
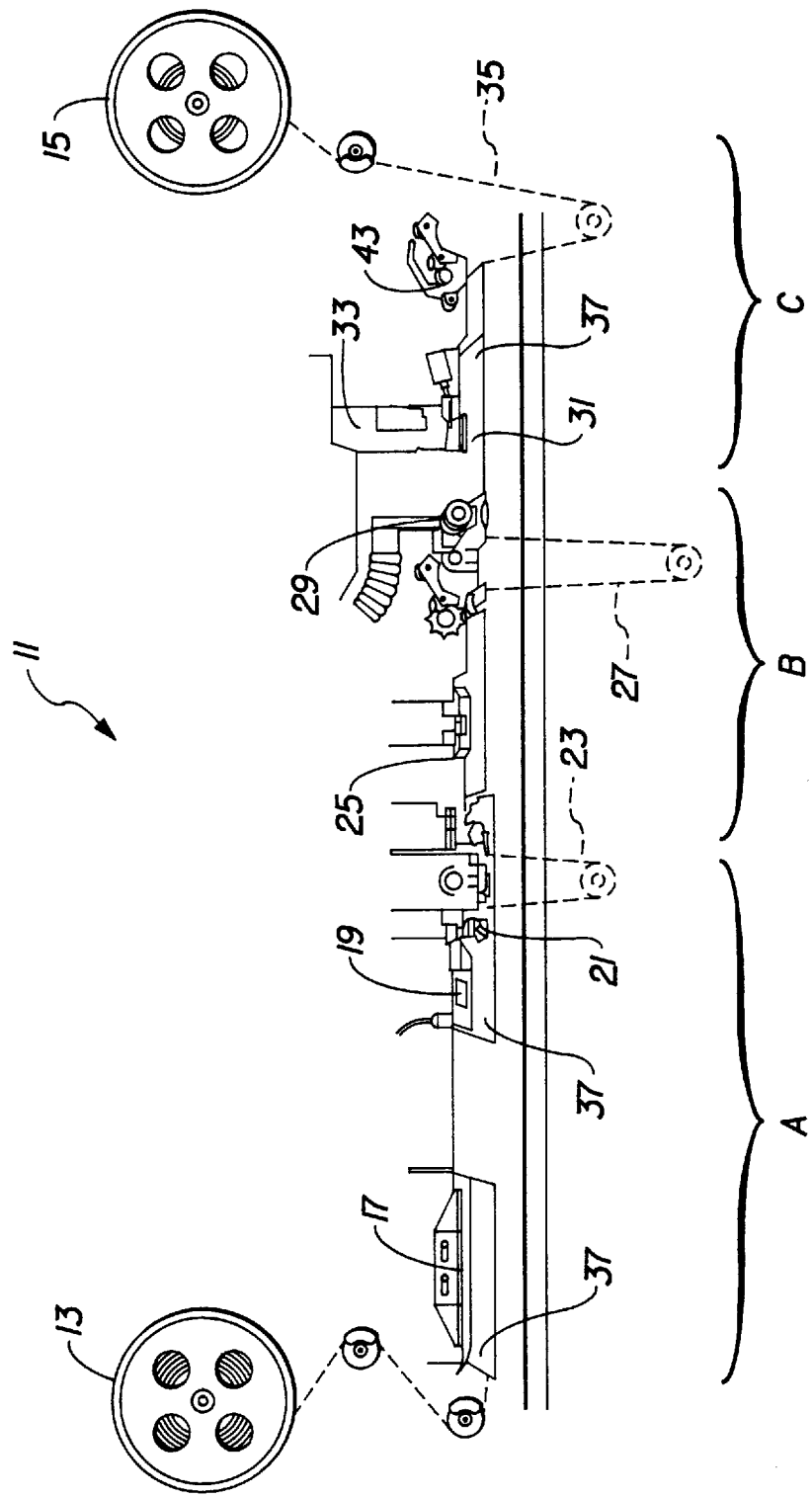
FIG. 1 is a schematic representation of a prior art high speed printer.

Referring now to FIG. 1, there is illustrated a prior art high speed printer 11. This type of printer is known as a CLAS 35 printer and is commercially available through Eastman Kodak Company of Rochester, N.Y. The printer 11 includes a supply reel 13 and a take-up reel 15. Several rolls of exposed processed 35 mm film are spliced end-to-end and loaded through the printer 11 as illustrated. This type of printer is capable of printing up to seven frames per second. The printer 11 is equipped with a splice print count reader 17, a view window 19, a film code reader 21, an FCR tracking loop 23, a scan gate 25, a scan tension loop 27, film cleaner brushes 29, a print gate 31, an integrator bar 33, and a print metering tracking loop 35. As illustrated in FIG. 1, the spliced length of film is threaded through a stationary film track 37. Discussion of what happens in each area of the film track 37 while the CLAS 35 is printing customer negatives will now be presented. For the purpose of this discussion, the film is assumed to be already threaded and running through the track 37. The photofinishing process commences at a pre-scan area A. As the film makes its way from the supply reel 13 to the take-up reel 15 (left to right), it first passes through the splice print count reader 17. This station can read a code on the splice which tells the printer how many prints to make of each good negative in the order.

If the feature is turned on, the code is read as the splice goes by and the data is recorded for use when the prints are made a few seconds later. Following a shutdown of the printer 11, the view window 19 provides a lighted area that allows restart of an autoprint function at a specific negative of the film in the track 37. Printing will restart at the negative placed into the view window 19.

The film code reader 21 reads the bar code information encoded on the film edge. The printer 11 uses the data to determine what film type is being printed. The film must always be delivered with the same orientation, last-frame-first (LFF) or first-frame-first (FFF), so that the bar code edge can be read by the film code reader 21. The FCR tracking loop 23 helps ensure that the film code reader 21 can reliably read the bar code on the edge of most films. The tracking loop 23 is formed automatically and stays the same size throughout printing.

Next, a respective negative enters a scan area B as indicated in FIG. 1. The scan gate 25 is formed by a slot in the film track 37. The film is scanned as it moves across the slot of the scan gate 25 from left to right. For each color (red, green, and blue), there are 864 (36×24) pixels (picture elements) generated during the scan of each negative, for a total of 2592. When a frame is scanned, it must move across the scan gate 25 at a constant speed. Each frame, however, must stop at the print gate 31 for the exposure to be made. The size of the scan tension loop 27 changes to allow a frame to stop at the print gate 31 while another frame is moving at a steady pace across the scan gate 25.

Finally, a respective negative enters a print area C. The print gate 31 is the opening above a lens (not shown) where the negative is exposed. The integrator bar 33 transmits the exposing light down from a lamphouse (not shown) to just above the film surface in the track 37. Whenever the printer 11 advances film, ionized air blows across the bottom of the integrator bar 33, and the film cleaner brushes 29 in the scanning area rotate to assist in cleaning the film. The film cleaner brushes 29 are continuously cleaned by a vacuum system. The print metering tracking loop 35 helps ensure reliable film movement at the print gate 31 by having the film wrap around a portion of a drive roller 43. The tracking loop 35 is formed automatically and stays the same size throughout printing.

There are also three film presence sensors (not shown) in the film track. One is located just before the view window 19, another right after the scan gate 25, and the last between the print gate 31 and the print metering tracking loop 35. These sensors are monitored continuously whenever film is threaded in the track 37 so that the printer 11 can tell when the film supply reel 13 runs out or if a film break occurs.

Figure 2:
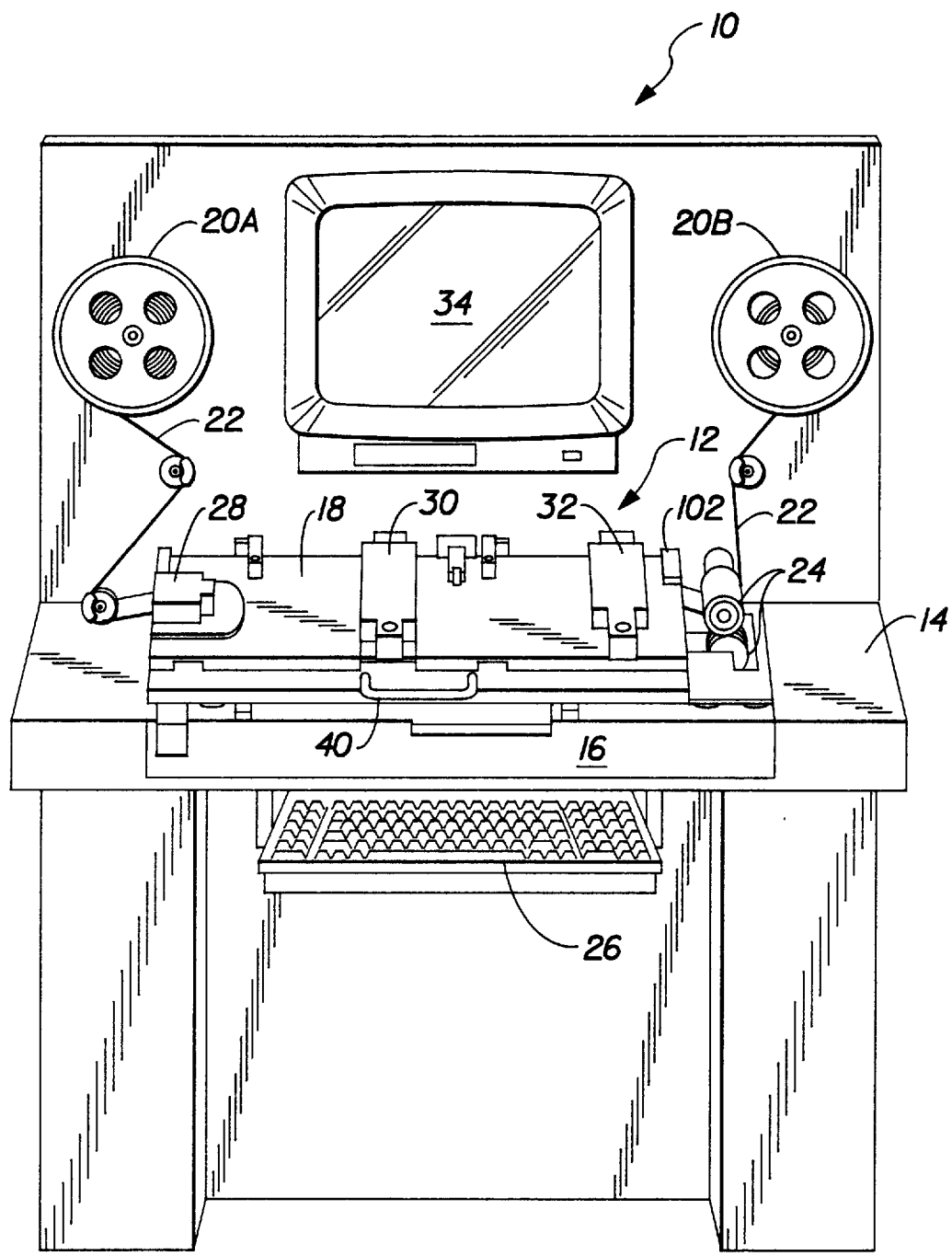
FIG. 2 is a front perspective view of a film deck and assembly shown for illustrative purposes in conjunction with a photofinishing device in accordance with a principle aspect of the present invention.

With reference to FIG. 2, there is shown a photofinishing device 10, including a film deck assembly 12 in accordance with the present invention. The particular photofinishing device 10 shown in FIG. 2 is configured as a film preparation work station for illustrative purposes only, it being understood that the film deck assembly 12 may be employed in any type of photofinishing device, for example, a printer such as the CLAS 35 high speed printer shown in FIG. 1, or any other piece of photofinishing equipment.

Figure 9:
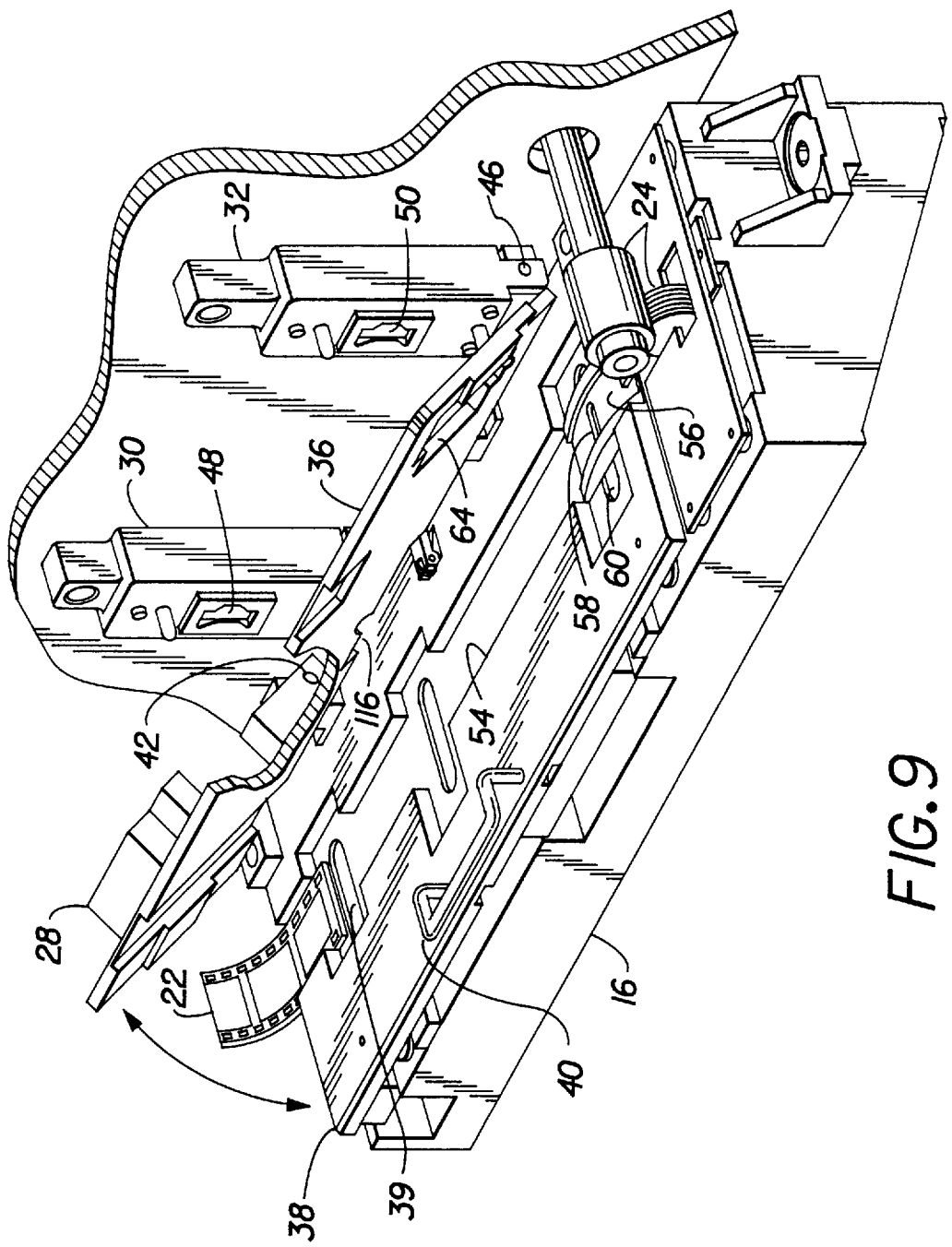
FIG. 9 is a view similar to FIG. 3, showing the film deck mounted at a work station of a photofinishing device in an open condition.

The photofinishing device 10 includes a console area 14 having a work station 16. A film deck 18 is insertable into the work station 16 in a manner that will be described below in further detail. The photofinishing device 10 is further provided with a supply film reel 20A and a take-up film reel 20B. The supply film reel 20A is loaded with exposed processed film 22 which typically comprises a plurality of rolls of film spliced end-to-end. The film 22 may be standard 35 mm film, 110 film, or any other size, format, or type of photographic film that is currently available or that may become available in the future. A pair of drive rollers 24 working in tandem with the reel 20A moves the film 22 along the console area 14 and through the film deck 18 so that the image information and other information on the film may be scanned for utilization by a processing lab. Movement of the film 22 through the film deck 18 is controlled by a conventional microprocessor (not shown) provided within the photofinishing device 10. A keyboard 26 is used to interact with the microprocessor for controlling the photofinishing device 10. As the film 22 enters the film deck 18 on the left side thereof, as viewed in FIG. 2, an LED photodetector 28 is employed to detect notches which may be formed along the edge of the film 22. A monitor 34 is provided for displaying information regarding the operation of the device 10. An infrared sensor 39, shown in phantom in FIG. 9, is utilized to detect splices between the individual rolls of film which may be standard thirty-six (36) or twenty-four (24) exposure film. A film code reader assembly 30 is provided for reading the bar code information contained on the edge of each roll of film. Film code reader assembly 30 typically comprises a plurality of CCD arrays 45*a*,45*b* (see FIG. 3) for reading such information. A CCD scanner assembly 32 containing a CCD array 41, also shown in phantom, is next employed to scan the visual information contained in each frame of the film 22. The visual information is then electronically processed and stored in the microprocessor. Electronic circuitry associated with the microprocessor indexes each image of each frame on the film 22 by co-processing relevant splice and bar code information. Any frame on the film 22 is thereby given a unique index.

Figure 3:
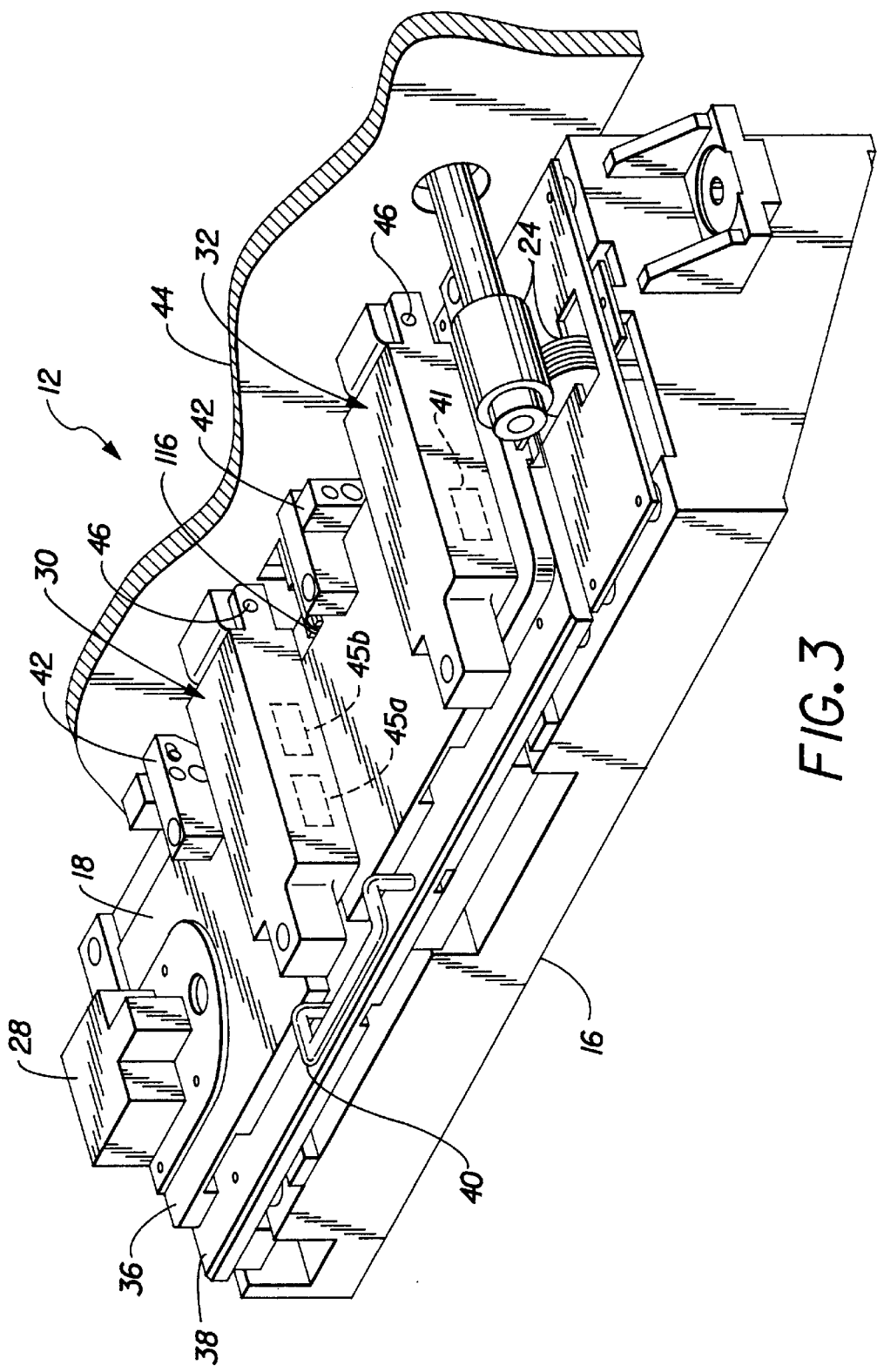
FIG. 3 is an isolated perspective view of the film deck assembly according to this invention, showing the film deck loaded and closed in a work station of a photofinishing device.
Figure 7:
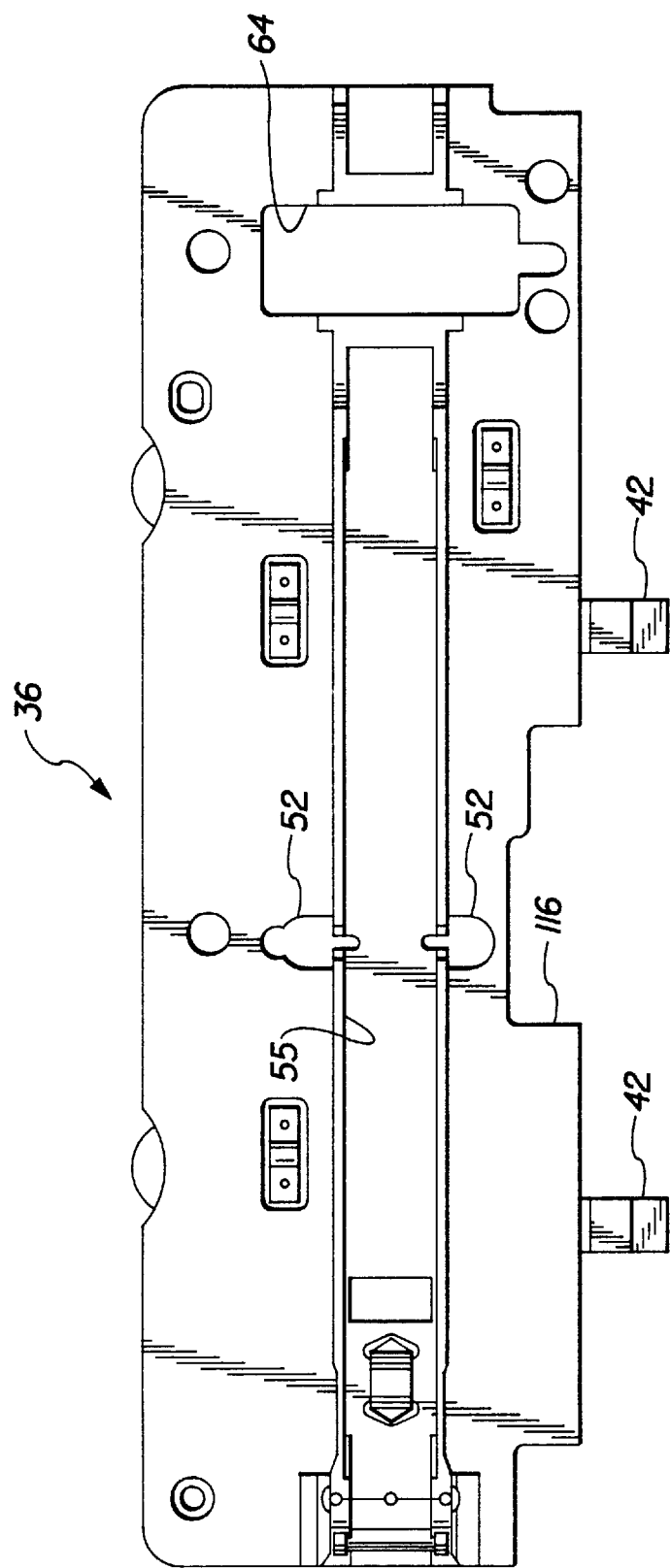
FIG. 7 is a view similar to FIG. 6, showing a bottom plan view of the upper plate of the film deck of the present invention.

With reference now to FIGS. 3, 4, 6, 7, and 9, it is shown that the film deck 18 includes an upper plate 36, a lower plate 38, and a handle 40, which is preferably secured to the lower plate 38. FIG. 3 shows the film deck 18 in a closed condition fully installed into the work station 16, while FIG. 4 illustrates the closed film deck 18 removed from the work station 16. The upper plate 36 and the lower plate 38 are hinged together by a pair of hinges 42. In this manner, the plates 36 and 38 may be in the closed or opened position relative to each other as illustrated in FIG. 9. Referring again to FIG. 4, it is shown that the work station 16 is provided with a back wall 44 to which the film code reader assembly 30 and the CCD scanner assembly 32 are each pivotally mounted by a corresponding pivot rod 46. FIG. 4 shows the film code reader assembly 30 and the CCD scanner assembly 32 in an open position. As can be seen in FIG. 4, the film code reader assembly 30 is provided with a detection window 48 for access to the LED (light emitting diode), (not shown), while the CCD scanner assembly 32 similarly includes a scanning window 50 so that light may be directly transmitted through the film 22 into the CCD array 41. The upper plate 36 of the film deck 18 is provided with a pair of apertures 52—52, (see FIGS. 4 and 7), which each straddle either edge of the film 22 as it moves through the film deck 18. When the film deck 18 is inserted into the work station 16, the film code reader assembly 30 may be closed down onto the upper plate 36 so that the detecting window 48 is aligned on top of the apertures 52. As best shown in FIGS. 4, 6, and 9, the lower plate 38 is provided with a film track 54 which includes a scanning area 56. A slit 58 is provided across the scanning area 56 as illustrated. In the preferred embodiment of the present invention, the upper plate 36 of the film deck 18 is provided with a corresponding film track 55 as best illustrated in FIG. 7. In this manner, when the plates 36 and 38 are closed against each other, the film tracks 54 and 55 are placed in register and provide a suitable track for movement of the film 22 therethrough. Notwithstanding the preferred two film tracks 54 and 55, it is contemplated that a single film track in either the upper plate 36 or lower plate 38 would be sufficient for practicing the present invention.

With continuing reference now to FIG. 4, a light source 62 is positioned in the work station 16 below the level of the lower plate 38 while the upper plate 36 includes an opening 64 which exposes the scanning area 56 when the plates 36 and 38 are closed against each other. When the film deck 18 is inserted into the work station 16 and placed in its closed condition, the CCD scanner assembly 32 may be closed on top of the upper plate 36. In this position, the CCD scanner assembly 32 is seated within the opening 64 and the scanning window 50 is aligned above the slit 58. Thus, in this manner, when the film 22 is moved over the slit 58 with the light source 62 illuminated, images on the film 22 will be transferred by light received by the CCD array 41 through the scanning window 50.

Figure 8:
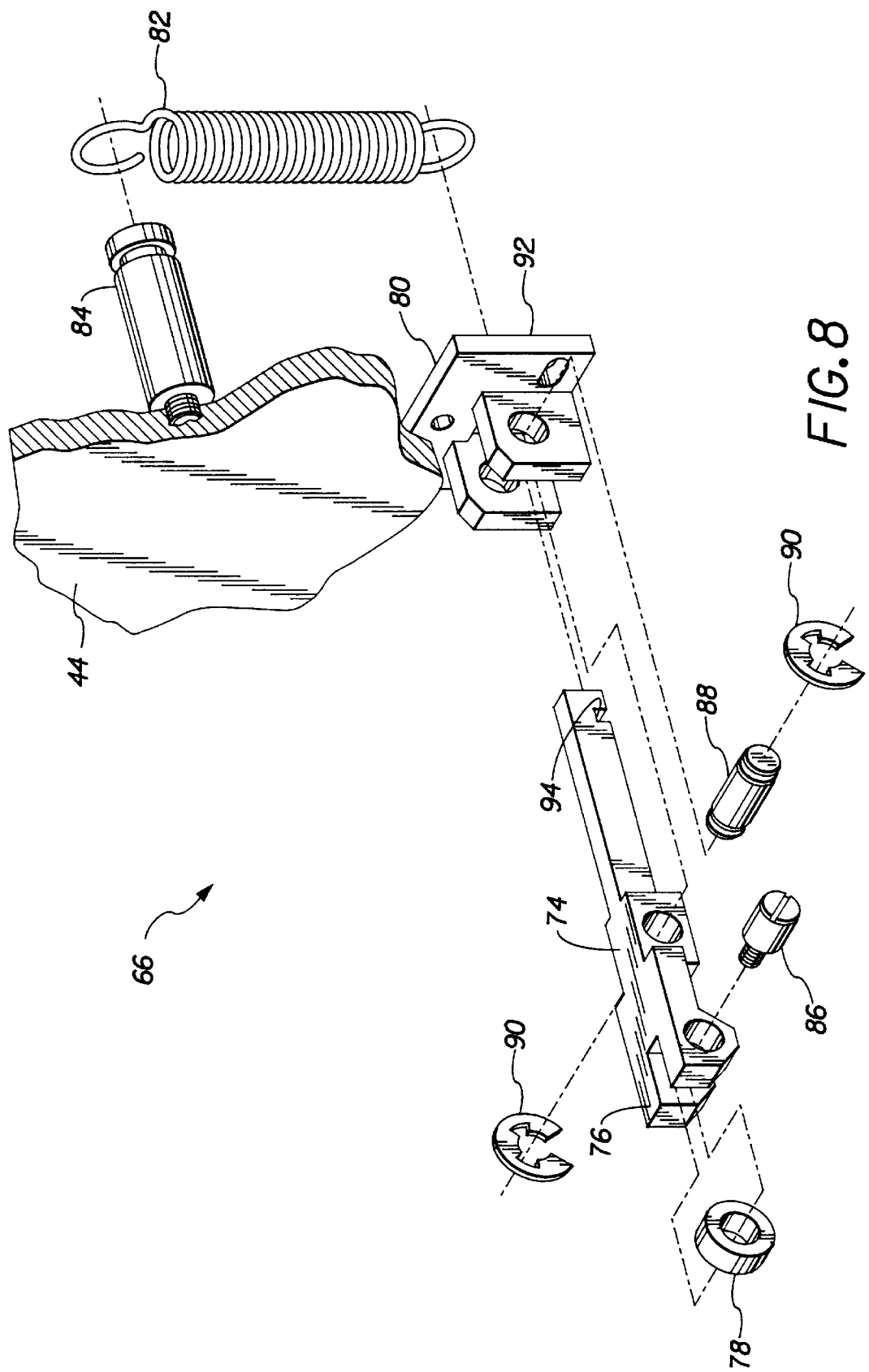
FIG. 8 is an isolated exploded perspective view of a roller arm assembly for use in retaining the film deck in the work station of a photofinishing device according to the present invention.

FIGS. 4, 5, and 8 illustrate a retaining arm assembly 66 used to apply a downward force on the lower plate 38 when the film deck 18 is inserted into the work station 16. The retaining arm assembly 66 is secured to the back wall 44 of the work station 16. As represented in FIG. 5, the lower plate 38 is provided with a ramp member 68 having a ramp segment 70 and a locking face 72. FIG. 8 shows that the retaining arm assembly 66 includes a rocker arm 74 with a distal end 76, a roller ring 78, a mounting bracket 80, a spring 82, and spring post 84. The roller ring 78 is rotatably secured on the distal end 76 of the rocker arm 74 by a locking screw 86. The rocker arm 74 is pivotally secured to the mounting bracket 80 by a grooved dowel 88 and a pair of E-rings 90—90 in the manner illustrated in FIG. 8. The mounting bracket 80 includes a face plate 92 which is secured to the rear side of the back wall 44 by a suitable fastener such as a screw or bolt. The spring post is screwed into the rear side of the back wall 44 as shown. The rocker arm 74 is provided with a notch 94 which extends through the mounting bracket 80 and the back wall 44. The spring 82 is looped between the notch 94 on the rocker arm 74 and the spring post 84 to bias the roller ring 78 downwardly. As best shown in FIG. 4, the distal end 76 of the rocker arm 74 extends into the work station 16 so that the roller ring 78 is aligned with the ramp member 68 when the film deck 18 is inserted into the work station 16.

With reference once again to FIG. 4, it is shown that work station 16 includes a pair of guide rails 96 and the lower plate 38 is provided with a pair of corresponding channels 98—98. In this manner, the film deck 18 may be slidably inserted into the work station 16 when each guide rail 96 engages a corresponding channel 98. A slotted retainer block 102 is provided on both ends of the work station 16 as illustrated in FIG. 4. When the film deck 18 is inserted into the work station 16, an outside edge 104 of the lower plate 38 will engage the slotted retainer block 102. This will keep the lower plate 38 from being displaced upwardly. The back wall 44 of the work station 16 is further provided with a pair of stops 106 which prevent the film deck 18 from further forward movement once the film deck 18 is in its fully inserted position as shown in FIG. 3. Upon insertion of the film deck 18 into the work station 16, an operator first holds the handle 40 and aligns the channels 98 with their corresponding guide rails 96. This step may be performed with the film deck 18 at a slight upwardly inclined angle relative to the horizontal of the work station 16. The film deck 18 is then rotated slightly upwardly to position the film deck 18 in a parallel relationship with the horizontal of the work station 16. The film deck 18 is slid into the work station 16 until the outside edge 104 of the deck engages the slotted retainer block 102. As the film deck 18 is further moved toward the back wall 44, a short slot 67 (see FIG. 6) in the bottom of the lower plate 38 will engage a locating pin 108. Next, the roller ring 78 will engage the ramp segment 70 of the ramp member 68, (see FIG. 5), and then fall against the locking face 72 as the lower plate 38 engages the stops 106. After the film deck 18 is inserted far enough to engage the guide rails 96, the slotted retaining block 102, and the locating pin 108, the deck is positioned within tolerances so that an electrical pin connector 110 is readily inserted into a mating plug socket 112. At this point, the roller ring 78 is engaged against locking face 72 ensuring adequate electrical contact between the electrical pin connector 110 and the mating plug socket 112. In this manner, an electric supply is provided to the LEDs photodetectors, and any other components on the film deck 18 that may require electric power to function. Finally, mounting pads 114 provide an accurate height determination between the lower plate 38 of the film deck 18 and the work station 16.

When the film deck 18 is fully inserted into the work station 16, as shown in FIGS. 3 and 9, the lower plate 38 is restrained against movement in all directions by the combined restraining effects of the slotted retaining block 102, the stops 106, the mounting pads 114, and the locking force applied by the rocker arm 74 and the roller ring 78 against the locking face 72 of the ramp member 68. In this condition, the film deck 18 is placed in a fully inserted loaded and locked position within the work station 16. The upper plate 36 is further provided with a notched opening 116 around the ramp member 68 of the lower plate 38 so that when the film deck 18 is placed in the fully inserted loaded position, the lower plate 38 is secured within the work station 16 as described above and, by virtue of the hinges 42, the upper plate 36 is openable relative to the lower plate 38 as illustrated in FIG. 9. In this condition, the film deck 18 is in a fully inserted, loaded and locked position, but in the open position. In this locked and opened position, the film track 54 is readily accessed for cleaning and clearing the film path. The upper plate 36 may be closed against the lower plate 38. In this condition, the film code reader assembly 30 and the CCD scanner assembly 32 may each be rotated downwardly about their respective pivot rods 46 to place the film deck assembly in the operation position shown in FIG. 3. This will place the detecting window 48 above the pair of apertures 52—52 and will similarly place the CCD scanner assembly 32 within the opening 64 with the CCD array 41 and the scanning window 50 aligned above the slit 58. Film 22 can now be auto threaded through the deck.

An important advantage of the present invention is that the light source for the film code reader assembly 30 and CCD array 41 are positioned below the film track 54, thus allowing the sensors to be postioned above the film track 54. Since the sensors are positioned above the film track, dust and debris will not fall thereon, thereby minimizing any build up that may accumulate thereon. Additionally, since the CCD array housing 32 and film code reader assembly 30 are pivotally mounted between an engaged position as illustrated in FIGS. 2 and 3, and a non-engaged position as illustrated in FIGS. 4 and 9. When the film code reader assembly 30 and CCD scanner assembly 32 are in the non-engaged position, the sensors contained therein can be easily cleaned and serviced. When the film code reader assembly 30 and CCD scanner assembly 32 are in the engaged position, the sensors are disposed directly above and adjacent to the filmstrip passing through the film track 54. Preferably, as illustrated, the CCD array 41 is in substantially virtual contact with the filmstrip (when in the engaged position as shown in FIG. 3), thus, not requiring any optical system between the CCD array 41 and the film. For the purposes of the present invention, virtual contact means that the CCD array is positioned within the appropriate focal distance with respect to the filmstrip that passes through the film track 54. Further, as illustrated in FIGS. 4 and 9, a pair of aligning pins 120,121 are provided on film code reader assembly 30 and CCD scanner assembly 32 for precisely aligning each of these with respect to film passing in film track 54. In particular, the aligning pins 120,121 align and mate with corresponding mating openings 122,123 (see FIGS. 4 and 6), respectively, formed in the upper plate 36 of the film deck 18. Thus, when the film code reader assembly 30 and CCD scanner assembly 32 are moved to the engaged position, the sensors contained therein will be precisely aligned with respect to the film contained in the film track 54.

Figure 10:
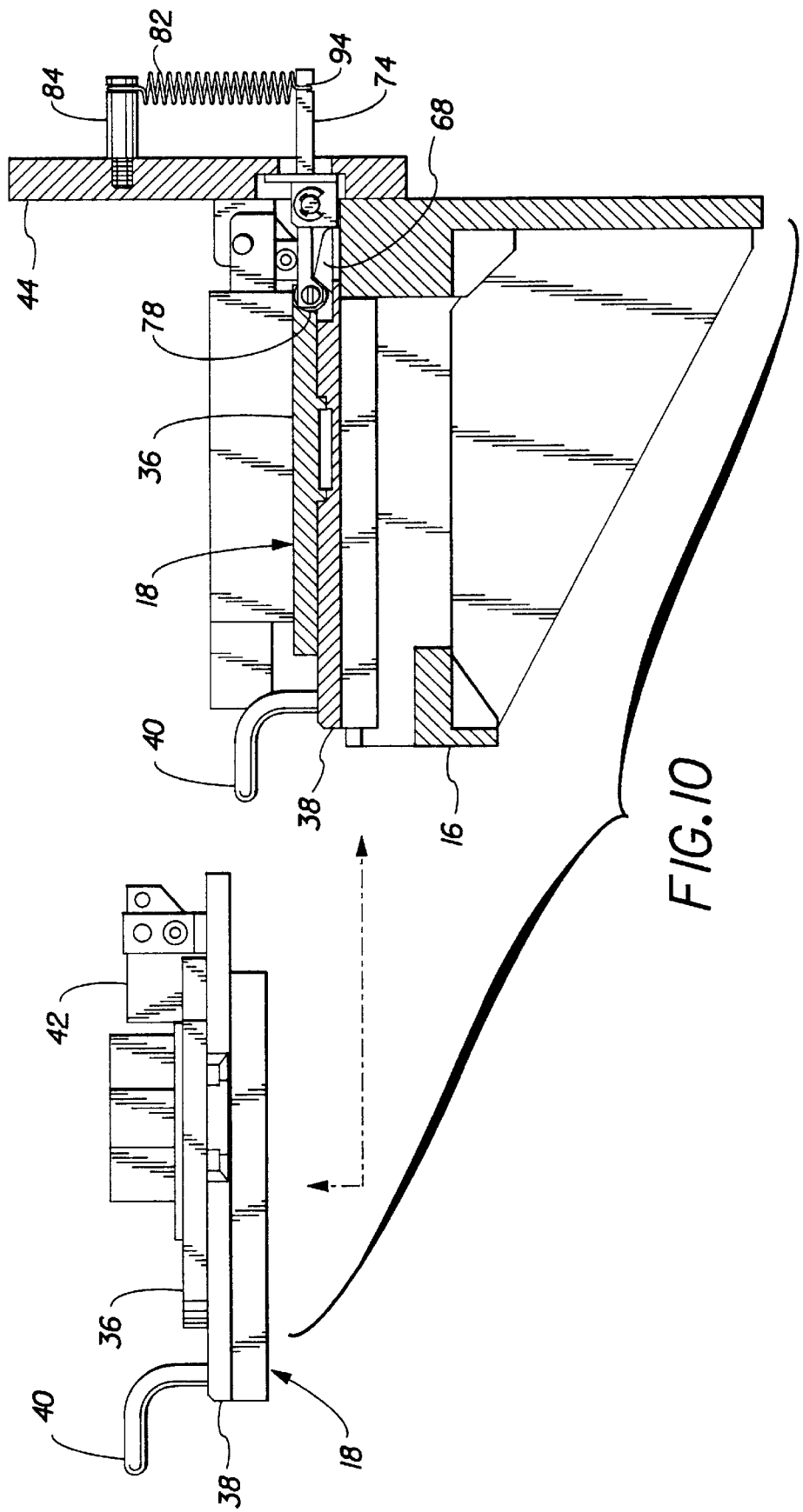
FIG. 10 is a side view schematic representation illustrating the interchange of a first film deck with a second film deck in accordance with another principle aspect of the present invention.

For the film deck 18 to be removed from the work station 16, the film code reader assembly 30 and the CCD scanner assembly 32 are each rotated upwardly about their respective pivot rods 46 to place them in the positions shown in FIGS. 4 and 9. With the upper plate 36 in the closed position, a fairly firm tug is applied to the handle 40 to overcome the restraining force applied by the rocker arm 74 and the roller ring 78 against the locking face 72 of the ramp member 68. The film deck 18 is thus readily removed from the work station 16 as illustrated in FIG. 4. It should be understood that the present invention contemplates use of at least two film decks 18 with any one particular photofinishing device 10. FIG. 10 illustrates the use of two such film decks 18. Each film deck 18 would be substantially identical in configuration and loaded into the photofinishing device 10 as described above. The difference between the two film decks 18 would reside primarily in the width of the film tracks 54 and 55. In the event the photofinishing device 10 were designed to accommodate two different sizes or format types of film, such as, for example, 35 mm and 110 format film, two film decks 18 would be provided. The first film deck 18 would have film tracks 54 and 55 sized for one format type of film, and the second film deck 18 would have its film tracks 54 and 55 sized to accommodate the other type of film. As described above, each film deck 18 and the film tracks 54 and 55 are designed to contain a specific format type of photographic film 22 at the work station 16 so that the subject format of photographic film may be processed through the device. In this manner, when the film format type is changed on the photofinishing device 10 from a first format type to a second format type, the first and second film decks 18 are exchanged so that the second format type of photographic film may be processed by the device. The photofinishing device 10 may not necessarily be limited to accommodating two different types of film 22, but rather may include any number in addition thereto. In any event, the number of different types of film 22 which may be accommodated by the photofinishing device 10 will dictate the number of film decks 18 provided with that particular device. The film decks 18 will be substantially identical in configuration except for the specific size of their respective film tracks 54 and 55 and/or the features to be monitored by the device.

While this invention has been described in detail with reference to a certain preferred embodiment illustrated in conjunction with a particular photofinishing device, it should be appreciated that the present invention is not limited to that precise embodiment. In addition, the present invention is not limited to use in any particular photofinishing device, rather it may be readily employed in any film processing or photofinishing device adapted to process or photofinish different types and formats of film. Thus, in view of the present disclosure which describes the current best mode for practicing the invention, many modifications and variations would present themselves to those of skill in the art without departing from the scope and spirit of this invention, as defined in the following claims.

PARTS LIST

10 . . . photofinishing device
11 . . . high speed printer
12 . . . film deck assembly
13 . . . supply reel
14 . . . console area
15 . . . take-up reel
16 . . . work station
17 . . . count reader
18 . . . film deck
19 . . . view window
20A . . . film supply reel
20B . . . film take-up reel
21 . . . film code reader
22 . . . exposed processed film
23 . . . FCR tracking loop
24 . . . drive rollers
25 . . . scan gate
26 . . . keyboard
27 . . . scan tension loop
28 . . . LED photodetector
29 . . . film cleaner brushes
30 . . . film code reader assembly
31 . . . print gate
32 . . . CCD scanner assembly
33 . . . integrator bar
34 . . . monitor
35 . . . tracking loop
36 . . . upper plate
37 . . . stationary film track
38 . . . lower plate
40 . . . handle
41 . . . CCD array
42 . . . hinges
43 . . . drive roller
44 . . . back wall
45a,45b . . . CCD arrays
46 . . . pivot rod
48 . . . detection window
50 . . . scanning window
52 . . . apertures
54 . . . film track
55 . . . corresponding film track
56 . . . scanning area
58 . . . slit
62 . . . light source
64 . . . opening
66 . . . retaining arm assembly
67 . . . short slot
68 . . . ramp member
70 . . . ramp segment
72 . . . locking face
74 . . . rocker arm
76 . . . distal end 78 ... roller ring
80 ... mounting bracket
82 ... spring
84 ... spring posts
86 ... locking screw
88 ... grooved dowel
90 ... E-rings
92 ... face plate
94 ... notch
96 ... guide rails
98 ... corresponding channels
102 ... slotted retainer block
104 ... outside edge
106 ... stop bumpers
108 ... locating pin
110 ... electrical pin connector
112 ... mating plug socket
114 ... mounting pads
116 ... notched opening
120,121 ... aligning pins
122,123 ... mating openings

We claim:

1. A photofinishing device for handling different formats of photographic film, said photofinishing device comprising:

a work station for receiving at least one format type of photographic film;

means for moving said one format type of photographic film along said work station; and at least one sensor assembly pivotably mounted to said photofinishing device so as to move between an engaged position and a non-engaged position, said at least one sensor assembly having a sensor, said sensor being in substantial contact with said film when said at least one sensor assembly is in the engaged position, said at least one sensor assembly when in the non-engaged position, allowing easy access to said sensor.

2. The photofinishing device according to claim 1 further comprising means for containing a filmstrip at a predetermined position with respect to said work station, said means for containing said filmstrip comprising a film deck having an upper plate and a lower plate.

3. The photofinishing device according to claim 2 wherein said upper plate of said film deck is hinged to said lower plate of said film deck so that one plate may be opened relative to the other plate.

4. The photofinishing device according to claim 3 wherein at least one of said upper and lower plates of said film deck includes a track extending therealong through for receiving and guiding said photographic film.

5. The photofinishing device according to claim 4 wherein said means for precisely positioning said sensor assembly comprises at least one locating pin provided on said sensor assembly which mates with a locating opening provided in said film deck.

6. The photofinishing device according to claim 4 wherein said work station further includes at least one stop to restrain said film deck against further forward movement when said film deck is inserted into said work station.

7. The photofinishing device according to claim 1 wherein said sensor comprises a CCD array, said CCD array being secured to said at least one sensor assembly such that when said at least one sensor assembly is in the engaged positioned said CCD array will be positioned within focal distance with respect to said film.

8. A photofinishing device for handling different formats of photographic film, said photofinishing device comprising:

a work station for receiving at least one format type of photographic film;

means for moving said at least one format type of photographic film along said work station; and at least one sensor assembly mounted to said photofinishing device for movement between and engaged position and a non-engaged position, said at least one sensor assembly having a sensor, said at least one sensor assembly being positioned above the photographic film in said work station when in the engaged position.

9. The photofinishing device according to claim 8 wherein said at least one sensor assembly includes a CCD array, said CCD array being secured to said at least one sensor assembly such that when said at least one sensor assembly is in the engaged positioned said CCD array will be positioned within the focal distance of said CCD array with respect to said film.

* * * * *